United States Patent [19]

Watanabe et al.

[11] Patent Number: 4,991,905
[45] Date of Patent: Feb. 12, 1991

[54] VEHICLE CONSTRUCTION OF AUTOMOBILE PROVIDED WITH SLIDE DOOR

[75] Inventors: Tomoyoshi Watanabe; Keiichi Asai, both of Hamamatsu, Japan

[73] Assignee: Suzuki Motor Company Limited, Hamana, Japan

[21] Appl. No.: 396,515

[22] Filed: Aug. 21, 1989

[30] Foreign Application Priority Data

Aug. 29, 1988 [JP] Japan .................................. 63-214682
Aug. 29, 1988 [JP] Japan .................................. 63-214686
Aug. 29, 1988 [JP] Japan .................................. 63-214687

[51] Int. Cl.$^5$ .............................................. B60J 5/05
[52] U.S. Cl. ........................................ 296/155; 49/213
[58] Field of Search ................... 296/155, 146, 209; 49/213, 214

[56] References Cited

U.S. PATENT DOCUMENTS 3,312,015  4/1967  Plegat ...................................... 49/213
4,506,911  3/1985  Nakamura et al. .................. 296/155
4,580,823  4/1986  Yamada et al. ....................... 296/155
4,582,357  4/1986  Nakamura et al. .................. 296/155

FOREIGN PATENT DOCUMENTS 3310559  1/1984  Fed. Rep. of Germany .
1359899  3/1963  France .
  33016  2/1982  Japan .
  14520  1/1984  Japan .
2126173  3/1984  United Kingdom .

Primary Examiner—Robert R. Song
Attorney, Agent, or Firm—McGlew and Tuttle

[57] ABSTRACT

Disclosed is a vehicle construction of an automobile provided with a slide door being used in a front door of an automobile and having an upper side front end positioned at the rear of a lower side front end, roller assemblies provided in an upper side front end, a lower side front end and an intermediate of back end portion, and guide rails for supporting the roller assemblies arranged in an upper, a lower and an intermediate portions of a car body.

2 Claims, 6 Drawing Sheets

VEHICLE CONSTRUCTION OF AUTOMOBILE PROVIDED WITH SLIDE DOOR

FIELD OF THE INVENTION AND RELATED ART STATEMENT

The present invention relates to an automobile provided with a slide door, more particularly relates to a vehicle construction of an automobile provided with the slide door as the front door of the vehicle.

A slide door provided as an automobile is formed in a rectangular shaped door for use in a wagon car and as a pentagon shaped door having a shorter upper side for use in a passenger car.

The slide door is formed by engaging an upper, an intermadiate and a lower guide rail provided in a side sill and a side panel with a guide roller through an upper, an intermediate and a lower support arm.

In the slide door utilized in a wagon car, a force (an inertia force) caused when the door is closed and a stopper force when the door is stopped are balanced because both the upper and lower end portions of the slide door are simultaneously in contact with the shut stopper when the door is closed.

Contrarily, in the slide door of the passenger car, an inertia force acts on the upper support arm it in rotate to the forward direction because the lower half of the slide door contacts with the shut stopper.

Thereby, it is possible for the roller to become damaged on contacting the support arm with the end portion of the guide rail or it is possible for a flange, or the support arm to become bent.

On the other hand, a hinged door is generally used in an automobile. Therefore, when the slide door is used in place of the hinged door, the space between the front pillar and the front fender can be seen from the outside when the slide door is opened, this causes an undesirable appearance.

THE OBJECT OF THE INVENTION

The present invention aims at providing a vehicle construction of an automobile including a slide door which solves the problem as described above and which improves the durability of the slide door.

The object of the present invention is to provide a vehicle construction of an automobile provided with the slide door for covering the space between a front pillar and the front fender in a simplified manner and without raising the cost of manufacture.

Further, another object of the present invention is to a vehicle construction of an automobile provided including a slide door capable of fixing the end portion of a sill side trim with the side body inner panel without spoiling the appearance.

For achieving the above mentioned objects, the present invention provides a vehicle construction of an automobile with a slide door being used in a front door of an automobile and having an upper side front end positioned at the rear of a lower side front end thereof, wherein a stopper for being engaged with a portion of the car body when the slide door is closed is provided on the upper side of the slide door, and the stopper is in contact with the car body before the upper guide roller makes contact with the car body to prevent damage of the slide door caused by an inertia force.

Further, the present invention provides a vehicle construction of an automobile with the slide door being used in a front door of an automobile and having an upper side front end positioned at the rear of a lower side front end thereof, wherein a fender rear cover for covering the space between the front pillar and the front fender having one side portion fixed with the front pillar and other side portion bent to the inner portion thereof is provided having the bent portion along the front fender, and end side phase of the slide door is engaged with the fender rear cover.

Furthermore, in the vehicle construction provided with the slide door of the present invention, a side body is arranged to project to the interior for storing the front end bent portion of the center rail and has a cutis formed to be extending, the projected portion of the side body is covered with the extended cutis, a plate is arranged in the lower portion of the side body, the extended cutis is caught into the lower end of the plate, and the end portion of extended cutis and the sill side trim are sandwiched by the plate and the side body.

BRIEF DESCRIPTION OF THE DRAWINGS

FIG. 1 is a conceptual view showing the condition when the slide door is removed, FIG. 2 is a perspective view showing the condition when the slide door is closed, FIG. 3 is a conceptual view showing the halfway point of opening of the slide door.

DETAILED DESCRIPTION OF PREFERRED EMBODIMENTS

Now, an example of the present invention will be explained with reference to the drawings.

Figure 1:
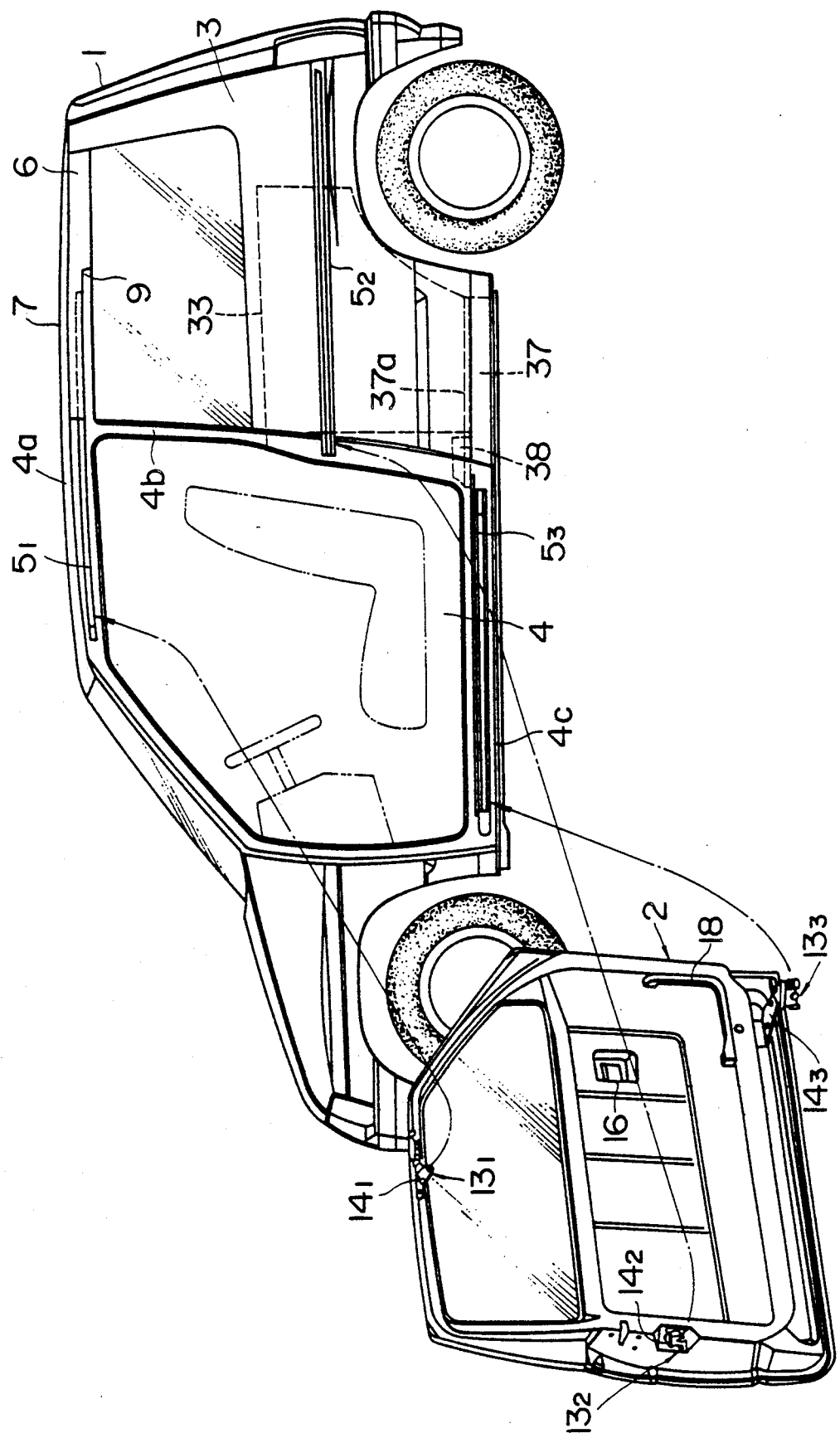
FIGS. 1 through 3 are showing an example of a vehicle construction provided with a slide door of the present invention.
Figure 2:
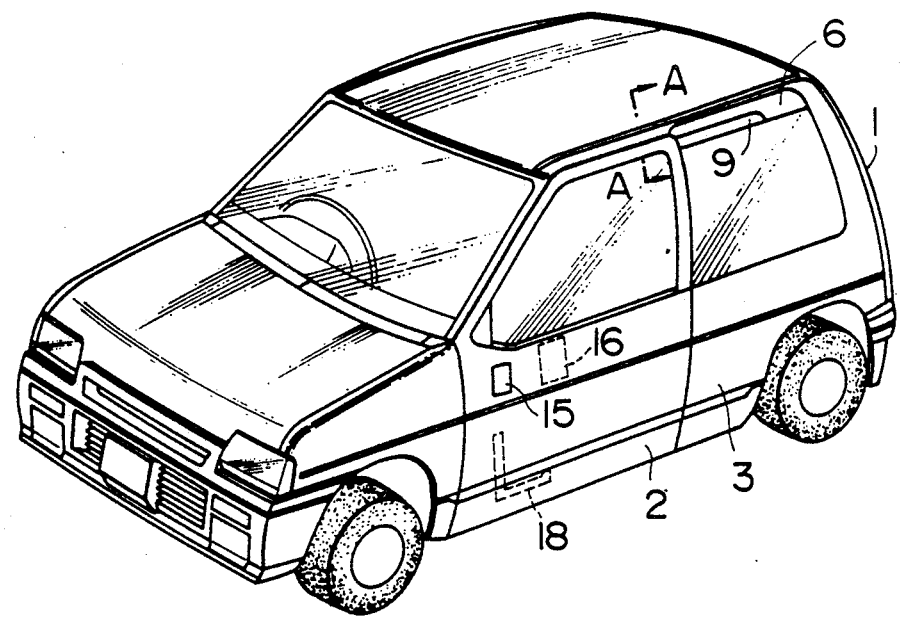
Figure 3:
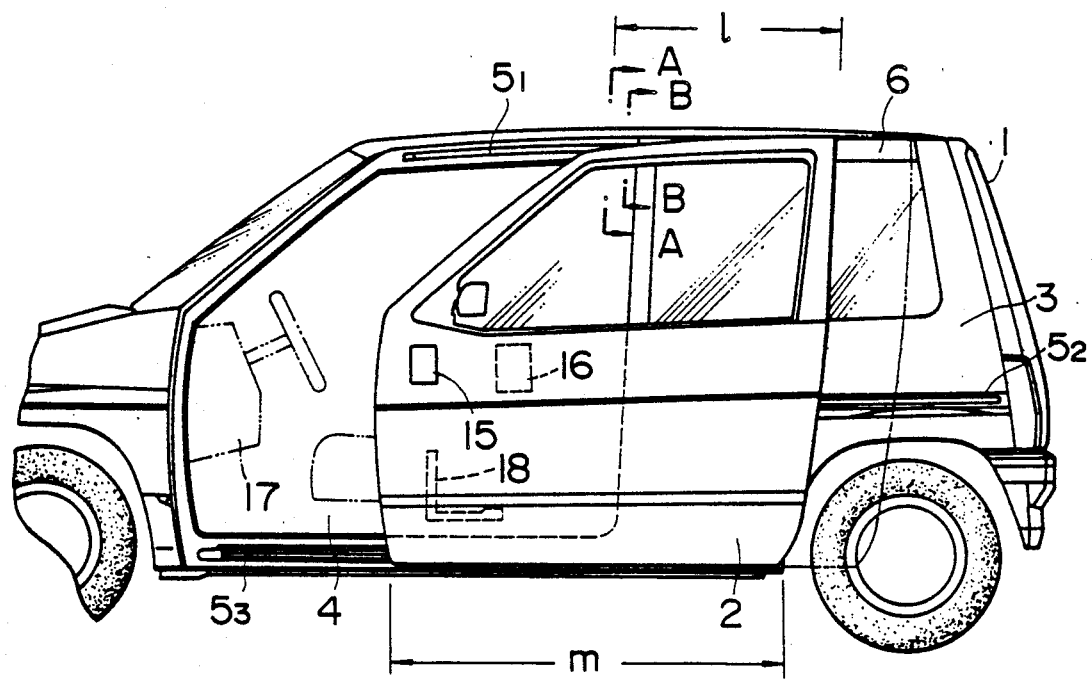

In FIGS. 1 through 3, numeral 1 is a body of automobile provided with a slide door 2, which has an opening 4 for mounting the slide door 2 formed in a side panel 3 as an get in and off portion. The slide door 2 has similar form as an usual door for a passenger car, which has the upper side length l formed shorter than the lower side length m, and the front of the upper side is formed to be inclined.

The upper guide rail $5_1$ and the lower guide rail $5_3$ are respectively arranged on the upper edge 4a and the lower edge 4c of the opening 4. And the intermediate guide rail $5_2$ having same direction as the upper and the lower guide rails $5_1$ and $5_3$ is arranged on the side panel backward of the back side edge 4b.

Figure 4:
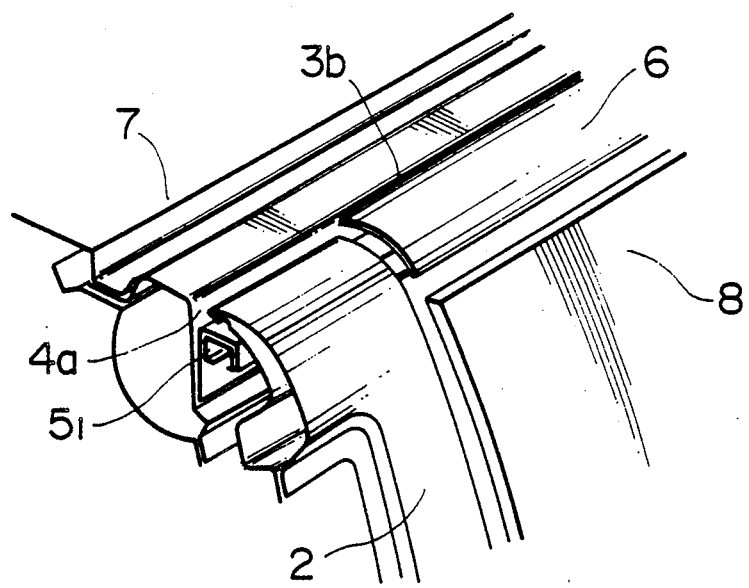
FIG. 4 is a cross sectional perspective view of line A—A in FIG. 2.
Figure 5:
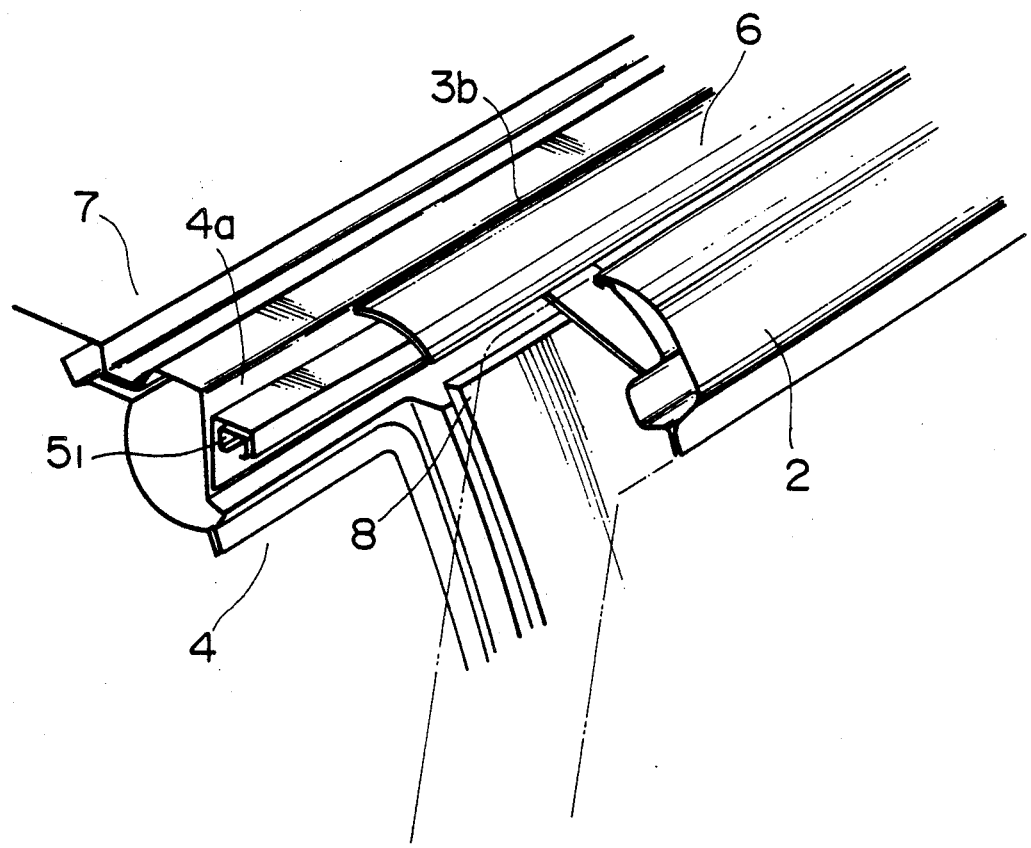
FIG. 5 is a cross sectional perspective view of line A—A in FIG. 3.
Figure 6:
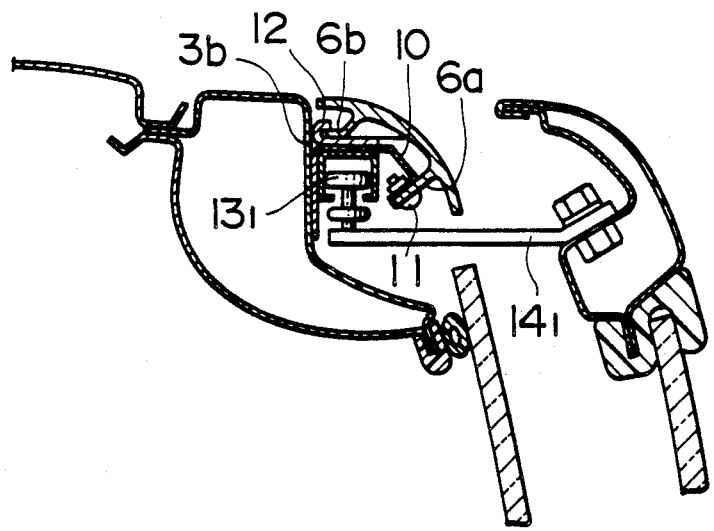
FIG. 6 is a cross sectional perspective view of line B—B in FIG. 3.

As shown in FIGS. 4 through 6, the upper guide rail 5 is formed to allow the roof side panel portion 3b is positioned rearwardly of the upper edge 4a of the opening 4 to be formed in the same phase position, the upper guide rail $5_1$ is formed to be extended from the roof side panel 3b. Thereby, the length of the upper guide rail $5_1$ can be set in a manner similar to that of the lower guide rail $5_3$.

Numeral 6 is a quarter trim element provided on the outer side of the guide rail $5_1$, which has an outline which is a continuation of the roof panel 7. The stage portion 9 is provided forming predetermined space between the quarter glass 8 and trim element 6. The stage portion 9 is provided in a lower edge of the quarter trim element 6, and the mount flange 6a and the engage pawl 6b are provided in the rear side of the quarter trim element 6.

On mounting the quarter trim element 6, the mount flange 6a can be fixed with the mount panel 10 provided in the roof side panel 3b by means of the screw 11, and the engage pawl 6b can be engaged with the engage portion 12 provided on the upper phase of the mount panel 10.

On the other hand, an upper, an intermediate and a lower guide roller $13_1$, $13_2$ and $13_3$ engaging with the upper, the intermediate and the lower guide rail $5_1$, $5_2$ and $5_3$ are provided in the slide door 2, the upper guide roller $13_1$ is supported by the lower support arm 14 mounted on the upper end of the slide door 2. And the lower guide roller $13_3$ is supported by the lower support arm 14 mounted on the lower end of the slide door 2. The intermediate guide roller $13_2$ is supported by the intermediate support arm mounted on the intermediate portion of the back side edge of the slide door 2.

The opening and closing the slide door 2 can be performed by an outside handle 15 provided on the outside phase of the slide door 2 and a door lock inside handle 16 provided in inside thereof. The door lock inside handle 16 is provided at the postion where it does interfere with an instrument panel 17. Numeral 18 is an auxiliary handle, which is provided at the position where it is concealed in the lower portion of the instrument panel when the slide door 2 is closed.

The front ends of guide rails $5_1$, $5_2$ and $5_3$, are formed to have a similar phase position to the side panel 3 by being bent in the direction of inner side of car body when the slide door 2 is closed.

Figure 7:
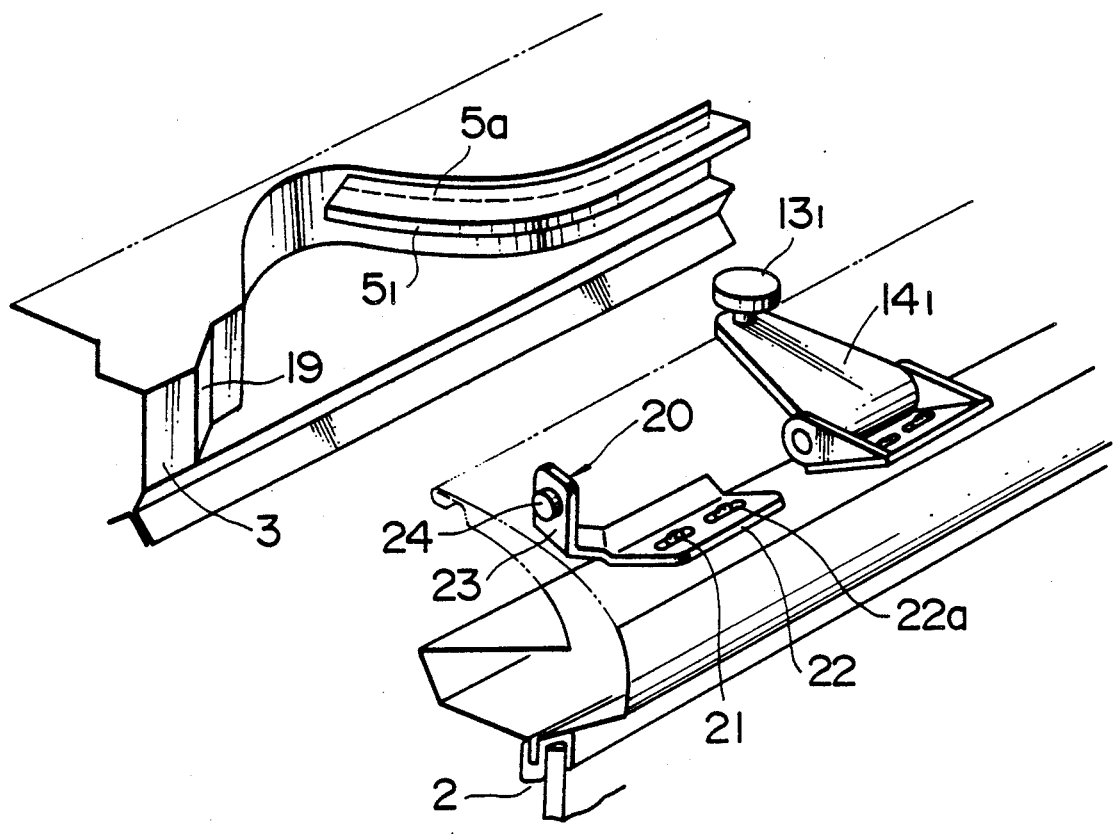
FIG. 7 is an enlarged perspective view showing the stopping position of FIG. 1.

FIG. 7 shows the front edge portion 5a of the upper guide rail $5_1$ and the upper guide roller $13_1$ of the slide door 2, wherein the fasten portion 19 is formed in the front panel of front edge portion 5a of the guide rail $5_1$.

On the other hand, the stopper, 20 being fastened to the front portion of the guide roller $13_1$ of the slide door 2 by the fasten portion 19, is mounted by means of the screw 21. The stopper 20 forms the long hole 22a on the base 22 which is formed to be screwed the long hole 22a and the flexible plate 24, such as a rubber plate, is mounted on its top end flange.

By the vehicle construction of automobile provided with the slide door as constructed above, the slide door can be moved along the guide rails $5_1$, $5_2$ and $5_3$ by the opening action to allow the opening 4 to be opened enough for getting in and out of the vehicle.

Then, the upper guide roller 13 moves along the upper guide rail $5_1$ to the space between the quarter garnish 6 and the quarter glass 8. Thereby, the slide door 2 allows the opening 4 to be fully opened.

For closing the slide door 2, the auxiliary handle 18 can be operated.

Since the slide door 2 is inserted so that it is moved to the same phase position as the side panel 3 along the guide rails $5_1$, $5_2$ and $5_3$. The slide door 2 then stops to contact with the shut stopper at the side phase or rear side of the opening 4. At this moment, the stopper 20 provided on the upper phase or upper side of the slide door 2 is also stopped to make contact with the fasten portion 19. Therefore, the rotation force caused at the top end portion of the slide door 2 can be prevented.

Figure 8:
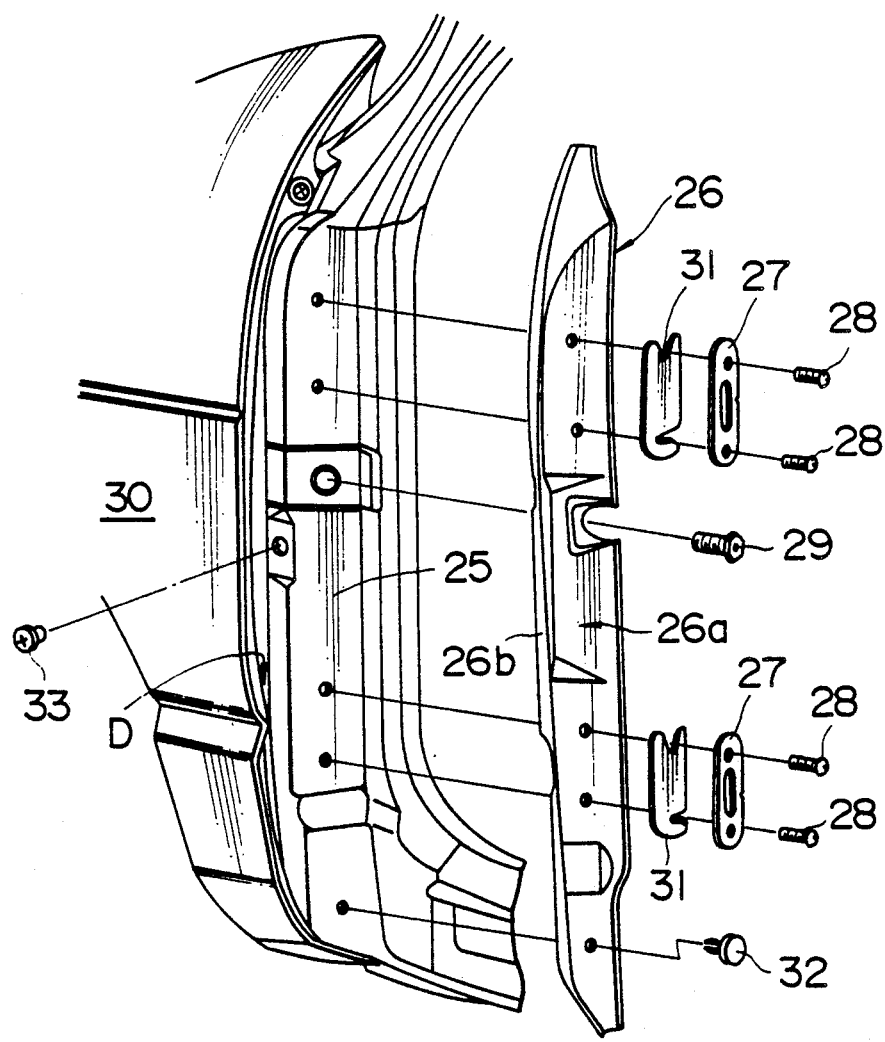
FIG. 8 is an enlarged exploded perspective view showing the portion of the front pillar and the slide door.
Figure 9:
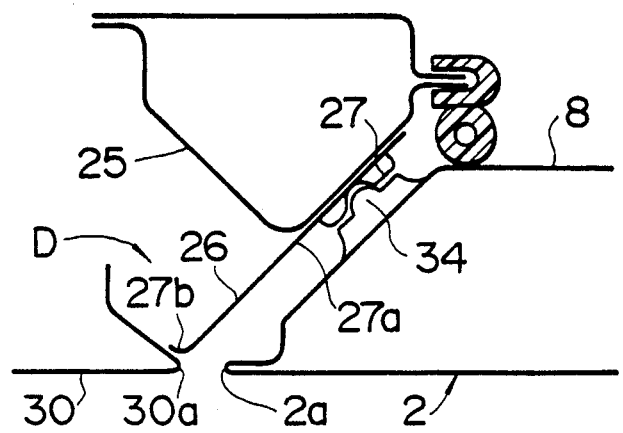
FIG. 9 is a cross sectional view conceptually showing the main construction.

FIG. 8 shows an enlarged view of the portion of the front pillar and the slide door in FIG. 1. The fender rear cover 26 is arranged in the front pillar 25. The fender rear cover 26 has the stopper 27 $27_1$, for positioning the slide door 2 at a certain position at closed condition, and one side edge portion 26a is fastened to the front pillar 25 together with the stopper 27 by means of the screw 28. Further, one end portion of the cushion 29 is fixed with the front pillar 25 in the fixing hole 25a and the other end portion is projected outwardly from the fender rear cover 26 through the outside for cushioning the slide door 2. As shown in FIG. 9, the other side edge 26b of the fender rear cover 26 is bent to the inner portion, and the bent portion is arranged to the back edge portion of the front fender 30 for covering the space D between the front pillar 25 and the front fender 30. In FIG. 8, numeral 31 is a spacer, 32 is a clip and 33 is a cap. And the stopper $27_2$ is arranged also on the other side phase of the slide door 2 to be engaged with the stopper 27 of the car body side on closing condition for positioning the slide door 2 to avoid the vibration.

In the car body as described above, the door end 2a is positioned near by the back end portion 30a of the front fender 30 affects the appearance of the interior of the car body. In the opened condition, the space D between the front pillar 25 and the front fender 30 is affected by the fender rear cover 26.

Figure 10:
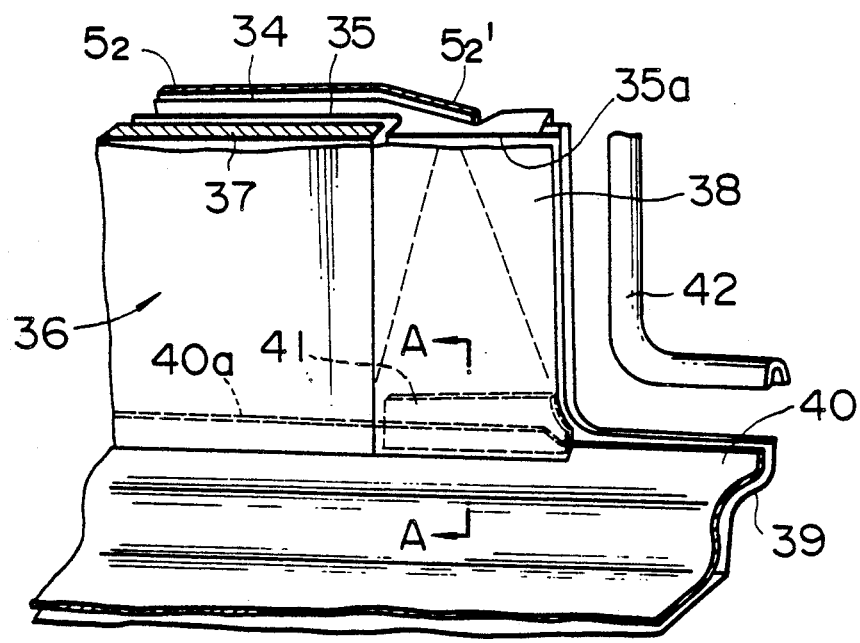
FIG. 10 is a view showing the portion of the sill side trim and the slide door from the inside view.
Figure 11:
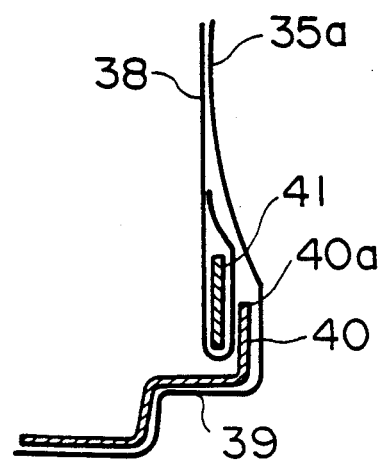
FIG. 11 is a cross sectional view of line A—A in FIG. 10.

FIG. 10 shows the interior of the car body. The front end portion $5_2'$ of the center rail $5_2$ is bent to the inner portion of the car body, in accordance with this, the side body outer panel 34 is shaped in a similar fashion. the side body inner panel 35 is also projected into the car body. And the body side trim 36 is arranged corresponding to the side body inner panel 35. The board 37 of the body side trim 36 is arranged on the side body inner panel 35 except for the projected portion 35a. The projected portion 35a is arranged only with the cutis 38. On the side sill panel 39, the sill side trim 40 is arranged, and the end portion 40a of the sill side trim 40 is sandwiched between the board 37 and the side body inner panel 35 along together with the cutis 38 of the body side trim 36. Further, the plate 41 made of metal or synthetic resin is arranged in the lower part of the projected portion of the side body inner panel 35. And as shown in FIG. 11, the cutis 38 of the body side trim 36 and the end portion 40a of the sill side trim 40 is sandwiched between the projected portion 35a of the side body inner panel 35 by the plate 41. Further, the sill side trim 40 and the cutis 38 of the body side trim 36 facing to the opening for the slide door 2 is covered with the weatherstrip 42 together with the side sill panel 39, the side body inner panel 35 and the side body outer panel 34 to be end portion treatment.

As described above, by the vehicle construction of automobile provided with the slide door of the present invention, since the stopper for being fastened in the inside of car body when the slide door is closed is arranged in the upper side of the slide door, the rotation force caused when the slide door is closed can be prevented. Thereby, the damage of the slide door can be prevented and the durability thereof can be improved. Further, the space between the front pillar and the front fender can be covered by arranging the plate type fender rear cover. Therefore, the present invention provides an automobile which is excellent in its outline and appearance and which has a simplified construction for covering the above mentioned space to cause less manufacturing cost. Further, the plate is arranged in the lower end of the side body inner panel of the side body projected into the car body in accordance with the front end of the center rail, and the lower end of the cutis of the body side trim is inserted to the plate and the end portion of the cutis is sandwiched between the side body inner panel together with the end portion of the sill side trim by means of the plate. Therefore, the cutis of the body side trim and the sill side trim can be surely fixed with the side door inner panel, and further, since the plate is covered with the cutis of the body side trim, the appearance is not spoiled.

What is claimed is:

1. An automobile construction, comprising a vehicle body defining a front door opening and including a rear body panel extending rearwardly of said front door opening; an upper, a central and a lower guide rail connected to said vehicle body; a slide door positionable in said front door opening for closing said front door opening, said slide door including an upper, a central and a lower guide roller engaging said upper, central and lower guide rails respectively, and upper side of said slide door has a length which is shorter than a length of a lower side of said slide door, a forward end of said upper side of said slide door is provided in a position which is rearwardly of a front end of said lower side of said slide door; a stopper provided at said front end of said upper side of said slide door positioned to engage an engaging portion positioned on a front side of said front door opening of said vehicle body substantially simultaneously with the front end of the lower side of said slide door engaging the front side of the front door opening of the vehicle body.

2. An automobile construction, comprising a vehicle body defining a vehicle front door opening; an upper, a central and a lower guide rail connected to said vehicle body; a slide door positionable in said vehicle front door opening, said slide door being connected to an upper, a central and a lower guide roller engageable with said upper, central and lower guide rail respectively, an upper side of said slide door being formed having a length which is shorter than the length of a lower side of said slide door, a front end of said upper side of said slide door being positioned rearwardly of a front end of said lower side of said slide door; a fender rear cover element having one side secured to a front pillar of said vehicle body and having another side bent inwardly, said bent portion being provided along said front fender for closing a clearance between said front pillar and said front fender; and, a stopper provided at said front fender for engaging a front end surface of said slide door.

* * * * *